(12) United States Patent
Yokoyama et al.

(10) Patent No.: US 6,331,238 B1
(45) Date of Patent: Dec. 18, 2001

(54) METHOD OF PATTERNING A SUBSTRATE WITH AN ATOMIC MASK

(75) Inventors: Takashi Yokoyama; Masakazu Baba, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/602,061

(22) Filed: Jun. 23, 2000

Related U.S. Application Data

(62) Division of application No. 08/834,030, filed on Apr. 11, 1997, now Pat. No. 6,099,945.

(30) Foreign Application Priority Data

Apr. 11, 1996 (JP) .................................................. 8-089738

(51) Int. Cl.[7] ................................. C25D 5/02; C25F 3/02; B44C 1/22; B05D 1/28; B05D 3/00
(52) U.S. Cl. ........................... 205/135; 216/41; 205/666; 427/264; 427/532; 427/552; 427/596
(58) Field of Search ..................................... 205/135, 666; 216/41; 427/532, 552, 264, 596, 597

(56) References Cited

U.S. PATENT DOCUMENTS 5,935,454 * 8/1999 Tada et al. ...................... 427/552 X
5,981,388 * 11/1999 Miyamoto ...................... 427/552 X

* cited by examiner

Primary Examiner—Donald R. Valentine
(74) Attorney, Agent, or Firm—Hayes, Soloway, Hennessey, Grossman & Hage, P.C.

(57) ABSTRACT

There is provided a method of patterning a substrate with an atomic mask having a mask substrate and first atoms adsorbed on the mask substrate, the first atoms forming a mask pattern having a one-atomic thickness, including the steps, in sequence, of (a) depositing adatoms over a surface of a substrate to be patterned, the adatoms having low reactivity with second atoms of which the substrate is composed, and (b) putting the atomic mask close to the substrate in such a distance that the first atoms make a chemical bond with the adatoms, so that adatoms located nearest to the first atoms are desorbed out of the substrate to form a pattern on the substrate, the pattern being defined as an area where none of the adatoms exists. In accordance with the above mentioned method, it is possible to form a pattern on the sub-nanometer or nanometer order with high accuracy and in a short period of time, and it is also possible to repeatedly form the same pattern by using the atomic mask.

44 Claims, 7 Drawing Sheets

FIG. 1A
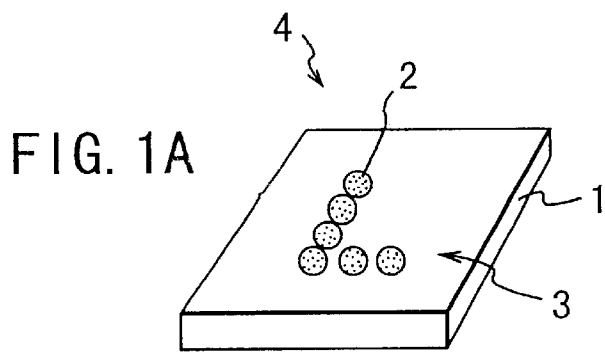
FIG. 1B
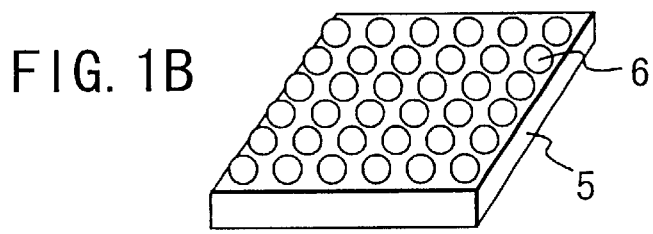
FIG. 1C
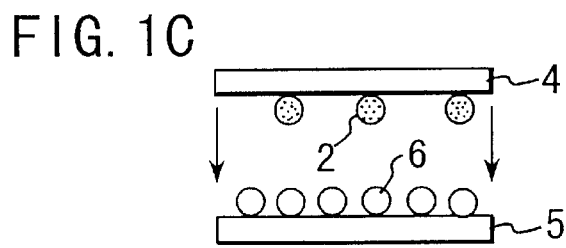
FIG. 1D
FIG. 1E
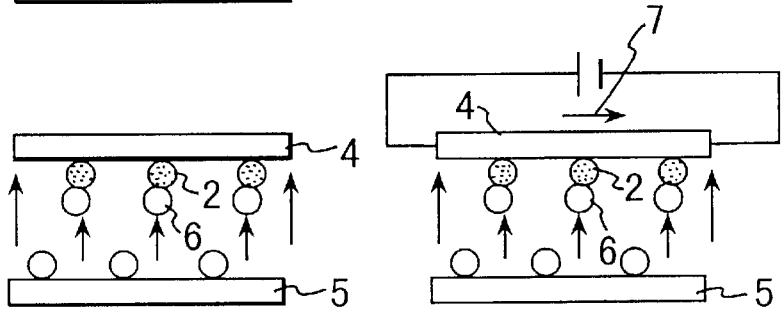
FIG. 1F
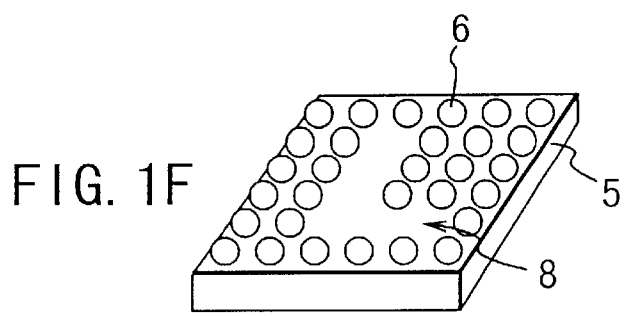

METHOD OF PATTERNING A SUBSTRATE WITH AN ATOMIC MASK

This is a divisional application of Ser. No. 08/834,030, filed Apr. 11, 1997, now U.S. Pat. No. 6,099,945.

BACKGROUND OF THE INVENTION

1. Field of the Invention

The invention relates to an atomic mask useful for a quantum well semiconductor laser utilizing quantum effects which take place in Bohr's atomic radius or smaller, the formation of a pattern in a ultra-micro device such as a single electron transistor, and the formation of a pattern in a recording medium such as CD-ROM. The invention also relates to a method of patterning a substrate with an atomic mask.

2. Description of the Related Art

As semiconductor devices have been fabricated in smaller and smaller sizes, a metal pattern is designed to have a narrower width, and is sometimes required to have an atomic-sized width on the sub-nanometer or nanometer order. Thus, there is a need for forming a fine pattern having an atomic-sized width.

To this end, there have been suggested many methods employing a scanning tunneling microscope (hereinafter, referred to simply as a "STM"). One of such methods has been suggested in I-W. Lyo et al., Science 253, pp. 173, 1991. In the suggested method, a probe of a STM is placed close to a substrate at such a distance as a tunnel current could run therebetween with a voltage being applied across the probe and the substrate. Atoms are desorbed out of the substrate because of the field evaporation effect which takes place when a tunneling current is generated.

In another method suggested by H. J. Mamin et al., "Atomic Emission from a Gold Scanning-Tunneling-Microscope Tip", Physical Review Letters, Vol. 65, No. 19, 1990, pp. 2418–2421, there is used a probe of a STM which is coated with gold atoms by evaporation. The gold atoms are transferred from the probe to a substrate and deposit on the substrate because of the field evaporation effect.

In still another method suggested by M. Baba et al., "Nanostructure Fabrication by Scanning Tunneling Microscope", Japanese Journal of Applied Physics, Vol. 29, No. 12, 1990, pp. 2854–2857, chlorine or fluorine gas is applied onto a substrate, and etching is carried out just beneath a probe of a STM to thereby pattern the substrate. For instance, a metal gas such as $WF_6$ gas is flowed onto a substrate, and is decomposed just beneath a probe of a STM and deposited onto the substrate. Thus a pattern is formed on the substrate.

However, the above mentioned conventional methods of forming a fine pattern by employing a STM have to repeatedly carry out the step of moving a probe to align with an atom one by one and applying a voltage across the probe and the atom. Thus, the conventional methods have a problem that it takes too much time to form a pattern.

In addition, the generation of a tunneling current is greatly dependent on the shape of the probe, configuration and defects of a substrate, and contamination on a substrate etc. For instance, if there happens to exist contamination at a place where a probe is positioned, the probe may be destroyed or conditions for making a pattern are significantly varied.

For the above mentioned reasons, the conventional methods would take much time for forming a lot of patterns, and might be quite unstable in forming patterns. Furthermore, a probe of a STM has to be repositioned each time when the same pattern is to be formed in other areas, resulting in a problem that it is impossible to shorten a period of time for forming a lot of patterns.

SUMMARY OF THE INVENTION

In view of the above mentioned problems of the conventional methods of forming a pattern by employing a STM, it is an object of the present invention to provide a method of forming an atomic-sized pattern which method is capable of forming a pattern with simple steps in a shorter period of time than conventional methods, and further capable of repeatedly forming the same patterns. It is also an object of the present invention to provide an atomic mask suitable for the above mentioned method.

In one aspect, there is provided an atomic mask including a mask substrate and atoms adsorbed on the mask substrate, the atoms forming a mask pattern having a one-atomic thickness. For instance, the atoms adsorbed on the mask substrate are noble metal such as tungsten, platinum, gold and palladium.

The atomic mask may further include a device for applying a current to the atomic mask, a heater for heating the atomic mask and/or a device for applying a voltage across the atomic mask and a substrate to be etched by using the atomic mask.

It is preferable that the mask substrate is formed with a raised area in which the mask pattern is formed. The raised area may be formed by etching an area other than the raised area. More specifically, the raised area may be formed by the steps of depositing adatoms over a surface of the mask substrate, putting a probe of a scanning tunneling microscope close to the mask substrate, and scanning the mask substrate with the probe with a voltage being applied across the mask substrate and the probe.

When the above mentioned atomic mask adsorbs adatoms which used to be deposited on a substrate to be patterned, the atomic mask may be recovered by heating in ultra-high vacuum.

In another aspect, there is provided a method of patterning a substrate with an atomic mask having a mask substrate and first atoms adsorbed on the mask substrate, the first atoms forming a mask pattern having a one-atomic thickness, including the steps, in sequence, of (a) depositing adatoms over a surface of a substrate to be patterned, the adatoms having low reactivity with second atoms of which the substrate is composed, and (b) putting the atomic mask close to the substrate in such a distance that the first atoms make a chemical bond with the adatoms, so that adatoms located nearest to the first atoms are desorbed out of the substrate to form a pattern on the substrate, the pattern being defined as an area where none of the adatoms exists.

The above mentioned method is explained in brief hereinbelow with reference to FIGS. 1A to 1F. As illustrated in FIG. 1A, there is prepared an atomic mask 4 comprising a mask substrate 1 and a mask pattern 3 composed of atoms 2 and formed on the mask substrate 1 by means of a STM (hereinafter, the atoms 2 are referred to as "mask atoms"). A desired pattern will be formed on a substrate by employing the atomic mask 4.

First, as illustrated in FIG. 1B, first atoms are adsorbed over a surface of the substrate 5 on which a desired pattern is to be formed. Herein, the first atoms are selected from atoms having low reactivity with second atoms of which the substrate 5 is composed (hence, hereinafter the first atoms are referred to as "adatoms", and the second atoms as "substrate atoms").

Then, as illustrated in FIG. 1C, the atomic mask 4 is placed close to the substrate 5 in such a manner that the atomic mask 4 is kept parallel to the substrate 5. When the atomic mask 4 is placed close to the substrate 5 in such a distance that the mask atoms 2 form a chemical bonding force such as Coulomb's force and electronegativity with the adatoms 6, the adatoms 6 located nearest to the mask atoms 2 are desorbed from the substrate 5 because of the chemical bonding force generated therebetween, and are adsorbed to the mask atoms 2 patterned on the atomic mask 4, as illustrated in FIG. 1D. Thus, the adatoms 6 are desorbed in a pattern in line with the mask pattern 3, as illustrated in FIG. 1F, and hence, a pattern 8 is formed on the substrate 5. Herein, the pattern 8 has the same configuration as that of the mask pattern 3, and is defined as an area in which none of the adatoms 6 exists.

There is further provided a method of patterning a substrate with an atomic mask having a mask substrate and first atoms adsorbed on the mask substrate, the first atoms forming a mask pattern having a one-atomic thickness, including the steps of (a) forming a raised area on the mask substrate, the mask pattern being to be formed within the raised area, (b) depositing adatoms over a surface of a substrate to be patterned, the adatoms having low reactivity with second atoms of which the mask substrate is composed, and (c) placing the atomic mask close to the substrate at such a distance that the first atoms form a chemical bond with the adatoms, so that adatoms located nearest to the first atoms are desorbed out of the substrate to form a pattern on the substrate, the pattern being defined as an area where none of the adatoms exists. The step (a) or (b) is first carried out, and the step (c) is finally carried out.

The raised area may be formed by etching an area other than the raised area. Specifically, the raised area may be formed by depositing adatoms over a surface of the mask substrate, placing a probe of a scanning tunneling microscope close to the mask substrate, and scanning the mask substrate with the probe with a voltage being applied across the mask substrate and the probe.

As illustrated in FIG. 5A, the mask atoms 2 patterned on the mask substrate 1 have quite a small height. Thus, an area of the mask substrate 1 other than an area 9 where the mask pattern 3 is to be formed is in advance etched, for instance, by STM, to thereby cause the area 9 to be raised above other areas, as illustrated in FIG. 5B. The formation of the raised area 9 makes it possible to significantly enhance reactivity between the mask atoms 2 and the adatoms 6 when the atomic mask 4 is placed close to the adatoms 6 adsorbed on the substrate 5.

There is still further provided a method of patterning a substrate with an atomic mask having a mask substrate and first atoms adsorbed on the mask substrate, the first atoms forming a mask pattern having a one-atomic thickness, including the steps, in sequence, of (a) depositing adatoms over a surface of a substrate to be patterned, the adatoms having low reactivity with second atoms of which the substrate is composed, (b) putting the atomic mask close to the substrate in such a distance that the first atoms form a chemical bond with the adatonms, so that adatoms located nearest to the first atoms are desorbed out of the substrate to form a pattern on the substrate, the pattern being defined as a first area where none of the adatoms exists, and (c) depositing third atoms having high reactivity with the adatoms and forming a bond with the second atoms, over a surface of the substrate to form a pattern in the first area and forming adatoms to be desorbed out of the substrate due to reaction with the third atoms, the pattern being defined as a second area where only the third atoms exist.

In the above mentioned method, the third atoms 10 are evaporated onto a surface of the substrate 5 on which the pattern 8 has been already formed (see FIG. 1F), as illustrated in FIG. 2A. Herein, the third atoms 10 have high reactivity with the adatoms 6, and also have a tendency of forming a bond with the substrate atoms 2. By evaporation of the third atoms 10 onto a surface of the substrate 5, the third atoms 10 are adsorbed on the substrate 5 only where the adatoms 6 do not exist, and at the same time, the adatoms 6 are desorbed from the substrate 5 because of high reactivity between the third atoms 10 and the atoms 6, as illustrated in FIGS. 2C and 2D. As a result, as illustrated in FIG. 2B, a pattern 11 is formed of the third atoms 10 in an area where the adatoms 6 used to not exist.

There is yet further provided a method of patterning a substrate with an atomic mask having a mask substrate and first atoms adsorbed on the mask substrate, the first atoms forming a mask pattern having a one-atomic thickness, including the steps, in sequence, of (a) depositing adatoms over a surface of a substrate to be patterned, the adatoms being composed of etching gas atoms, the substrate being composed of second atoms, (b) placing the atomic mask close to the substrate in such a distance that the first atoms form a chemical bond with the adatoms, so that adatoms located nearest to the first atoms are desorbed out of the substrate to form a pattern on the substrate, the pattern being defined as an area where none of the adatoms exists, and (c) causing the adatoms and the second atoms to react with each other for forming both the adatoms and the second atoms to be desorbed out of the substrate to etch a portion of the substrate where the adatoms used to be adsorbed.

In the above mentioned method, adatoms are selected from atoms of gases used for etching (thus, hereinafter atoms of gases used for etching are referred to simply as "etching gas atoms"). For instance, halogen atoms are used as adatoms. As illustrated in FIG. 3A, etching gas atoms 12 are adsorbed over a surface of the substrate 5. Then, for instance, light is radiated over the substrate 5, or the substrate 5 is heated to thereby make substrate atoms 13 and the etching gas atoms 12 react with each other. As a result, as illustrated in FIG. 3B, an area of the substrate 5 where the etching gas atoms 12 are adsorbed is etched, and hence a desired pattern is formed.

There is still yet further provided a method of patterning a substrate with an atomic mask having a mask substrate and first atoms adsorbed on the mask substrate, the first atoms forming a mask pattern having a one-atomic thickness, including the steps, in sequence, of (a) depositing adatoms over a surface of a substrate to be patterned, the adatoms having low reactivity with second atoms of which the substrate is composed, (b) placing the atomic mask close to the substrate in such a distance that the first atoms form a chemical bond with the adatoms, so that adatoms located nearest to the first atoms are desorbed out of the substrate to form a pattern on the substrate, the pattern being defined as an area where none of the adatoms exist, and (c) depositing etching gas atoms onto the substrate with the adatoms being used as a mask for causing the second atoms and the etching gas atoms to react with each other to form both the second atoms and the etching gas atoms desorb from the substrate, thereby a portion of the substrate where none of the adatoms exists being etched.

The above mentioned method may further include the step (e) of removing the adatoms out of the substrate. The step (e) is carried out subsequently to the step (c).

In the above mentioned method, as illustrated in FIGS. 3C, 3D and 3E, etching gas atoms 15 are adsorbed over a surface of the substrate 5 with the adatoms 14 acting as a mask. Then, the substrate atoms 13 are made to react with the etching gas atoms 15, for instance, by heating the substrate 5. Thus, as illustrated in FIG. 3F, an area of the substrate 5 where the adatoms 14 do not exist is etched, and a desired pattern is formed in an area where the adatoms 14 exist.

There is further provided a method of patterning a substrate with an atomic mask having a mask substrate and first atoms adsorbed on the mask substrate, the first atoms forming a mask pattern having a one-atomic thickness, including the steps, in sequence, of (a) depositing adatoms over a surface of a substrate to be patterned, the adatoms being composed of atoms which are readily doped into the substrate, the substrate being composed of second atoms, (b) placing the atomic mask close to the substrate in such a distance that the first atoms form a chemical bond with the adatoms, so that adatoms located nearest to the first atoms are desorbed out of the substrate to form a pattern on the substrate, the pattern being defined as an area where none of the adatoms exists, and (c) causing the adatoms to diffuse into the substrate.

In the above mentioned method, adatoms are selected from atoms 16 having a characteristic of being doped into the substrate 5, as illustrated in FIG. 4A (hereinafter, atoms 16 are referred to as "doping atoms"). The doping atoms 16 are diffused into the substrate 5, for instance, by radiating a light over the substrate 5 or heating the substrate 5. Thus, there is formed a pattern in an area of the substrate 5 where the adatoms 17 are adsorbed.

There is further provided a method of patterning a substrate with an atomic mask having a mask substrate and first atoms adsorbed on the mask substrate, the first atoms forming a mask pattern having a one-atomic thickness, including the steps, in sequence, of (a) depositing adatoms over a surface of a substrate to be patterned, the adatoms having low reactivity with second atoms of which the substrate is composed, (b) placing the atomic mask close to the substrate in such a distance that the first atoms form a chemical bond with the adatoms, so that adatoms located nearest to the first atoms are desorbed out of the substrate to form a pattern on the substrate, the pattern being defined as an area where none of the adatoms exists, and (c) depositing doping atoms over the substrate with the adatoms being used as a mask for causing the doping atoms to diffuse into the substrate.

In the above mentioned method, as illustrated in FIGS. 4B and 4C, doping atoms 18 are adsorbed over a surface of the substrate 5 with the adatoms 17 being used as a mask. Then, as illustrated in FIG. 4D, there is formed a pattern composed of the doping atoms 18, for instance, by heating the substrate 5.

In all of the above mentioned methods, a current may be applied to the mask pattern during the step of placing the atomic mask close to the substrate. As illustrated in FIG. 1E, the adatoms 6 adsorbed on the substrate 5 can be surely desorbed from the substrate 5 by virtue of field effect which is produced by applying a current to the mask pattern 3 formed on the mask substrate 1.

Similarly, the atomic mask and/or the substrate may be heated during the same step. As an alternative, a voltage may be applied across the atomic mask and the substrate during the same step.

The adatoms may be selected from halogen atoms such as chlorine (Cl), fluorine (F) and bromine (Br).

In accordance with the present invention, it is possible to form a pattern on the sub-nanometer or nanometer order with higher accuracy and in a shorter period of time than conventional methods, and it is also possible to repeatedly form the same pattern by using the atomic mask.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIGS. 1A to 1F are perspective or side views of an atomic mask and/or a substrate, showing respective steps of a method of patterning a substrate by employing an atomic mask, in accordance with the first embodiment of the present invention.

DESCRIPTION OF THE PREFERRED EMBODIMENTS

Preferred embodiments in accordance with the present invention will be explained hereinbelow with reference to drawings.

Figure 6:
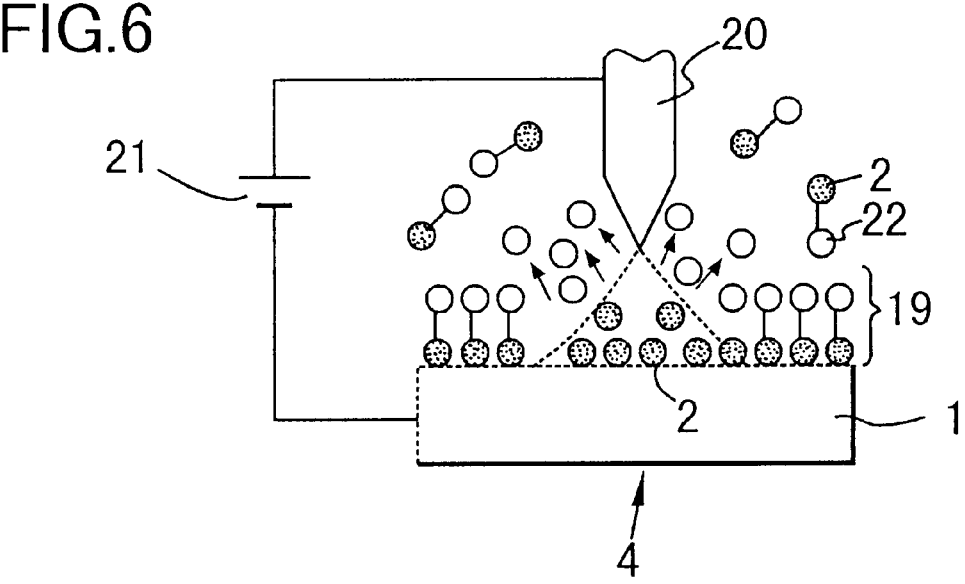
FIG. 6 is a side view of an atomic mask, illustrating a method of fabricating an atomic mask.

The first embodiment is explained hereinbelow with reference to FIGS. 6, 1A to 1F and 2A to 2D. FIG. 6 illustrates a method of fabricating an atomic mask to be used in the first embodiment. The atomic mask is fabricated employing a system for flowing various gases and an ultra-high vacuum STM including an evaporation source.

As illustrated in FIG. 6, there are used a mask substrate 1 and mask atoms 2 of which a mask pattern is composed. The mask substrate 1 is composed of Si or GaAs, and the mask atoms 2 are tungsten (W) atoms. After the mask substrate 1 is placed in a STM, metal gas 19 for forming a pattern is introduced into an evacuated container (not illustrated). In the instant embodiment, since the mask atoms 2 are tungsten atoms, there is used $WF_6$ gas as the metal gas 19.

Then, a STM probe 20 is placed close to a surface of the mask substrate 1, and subsequently an electric power source 21 applies a voltage across the probe 20 and the mask substrate 1. Herein, the applied voltage is determined so that the voltage corresponds to an energy by which atoms of the metal gas 19 are dissociated from the mask substrate 1. Specifically, the applied voltage is about 5 V. When the metal gas atoms are dissociated, volatile gas atoms or fluorine atoms 22 are scattered, and hence only tungsten atoms 2 are deposited on the mask substrate 1 as the mask atoms. Then, the probe 20 is moved along a desired pattern to thereby form a mask pattern 3 on the mask substrate 1. Thus, there is completed the atomic mask 4 including the mask pattern 3 composed of the atoms 2 and having a one-atomic thickness.

As explained hereinbelow, an aluminum wiring is formed on the substrate 5 by employing the above mentioned atomic mask 4 in the instant embodiment. As illustrated in FIG. 1A, the atomic mask 4 comprises the mask substrate composed of Si or Au, and the mask pattern 3 composed of the mask atoms 2 adsorbed on the mask substrate 1 in a pattern. The atoms 2 are tungsten atoms having relatively high melting point. Dangling bonds of the mask pattern 3 are terminated in order to prevent impurities such as oxygen in the atmosphere from adhering thereto.

The formation of a pattern 8 on a silicon substrate 5 is conducted in ultra-high vacuum, specifically at a vacuum of $4 \times 10^{-10}$ Torr or less, because the pattern formation is greatly influenced by soil or impurity, even if such soil or impurity consists of a few atoms. First, as illustrated in FIG. 1B, chlorine atoms 6 as adatoms are adsorbed over a surface of the silicon substrate 5 on which an aluminum wiring is intended to form. In order that the chlorine atoms 6 are uniformly distributed over the silicon substrate 5, chlorine gas of $8 \times 10^{-10}$ Torr is applied onto a surface of the silicon substrate 5 with the silicon substrate 5 being kept at about 450° C. Thus, the chlorine gas atoms 6 as adatoms are adsorbed on a surface of the silicon substrate 5. Then, the atomic mask 4 is heated up to about 800° C. in ultra-high vacuum to desorb impurity atoms from the tungsten atoms 2 to which the impurity atoms have been adhered. Thus, the tungsten atoms 2 are now in an activated state and hence are likely to react with other atoms.

Then, as illustrated in FIG. 1C, the atomic mask 4 is placed close to the silicon substrate 5 with the atomic mask 4 being kept in parallel alignment to the silicon substrate 5. When the mask pattern 3 formed on the mask substrate 1 approaches the adatoms 6 by a distance corresponding to diameters of a few atoms, specifically, a distance on the sub-nanometer or nanometer order, the chlorine atoms or adatoms 6 are influenced by a potential of the tungsten atoms 2 patterned on the mask substrate 1, and are desorbed from the silicon substrate 5, as illustrated in FIG. 1D. Thus, the chlorine atoms 6 are adsorbed to the tungsten atoms 2.

In order to facilitate the adsorption of the chlorine atoms 6 to the tungsten atoms 2, a current 7 may be applied to the mask pattern 3 of the atomic mask 4. The current 7 produces a field effect, which facilitates, the desorption and adsorption of the adatoms 6. As a result, the chlorine atoms 6 are desorbed from the silicon substrate 5 in accordance with the mask pattern 3, and accordingly there is formed a pattern 8 on the silicon substrate 5, which pattern 8 is the same in configuration as the mask pattern 3. As is obvious in FIG. 1F, the pattern 8 is defined as an area where the adatoms 6 do not exist.

Figure 2A:
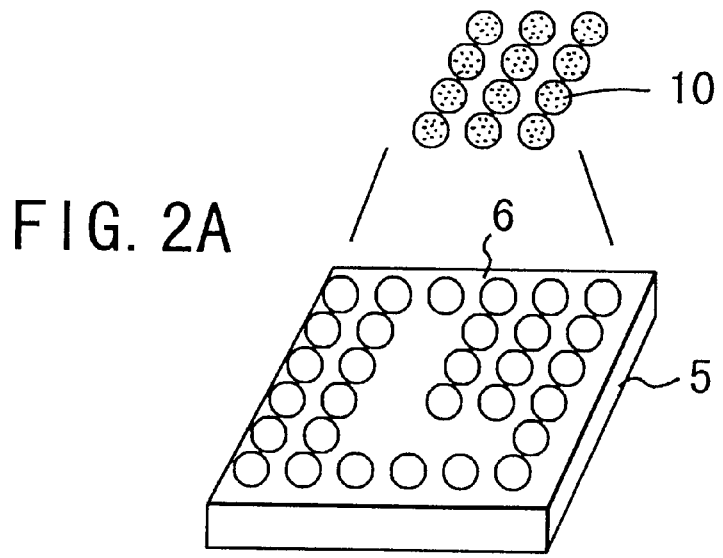
FIGS. 2A to 2D are perspective or side views of a substrate, showing respective steps of a method of patterning a substrate by employing an atomic mask, in accordance with the first embodiment of the present invention.
Figure 2B:
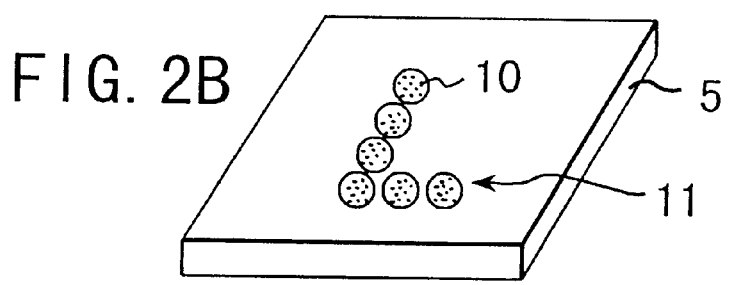
Figure 2C:
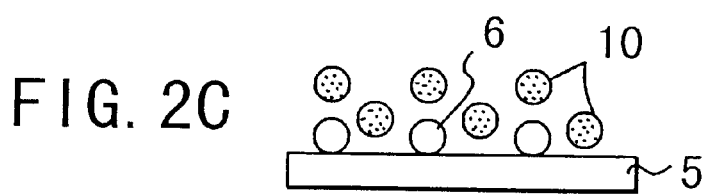
Figure 2D:
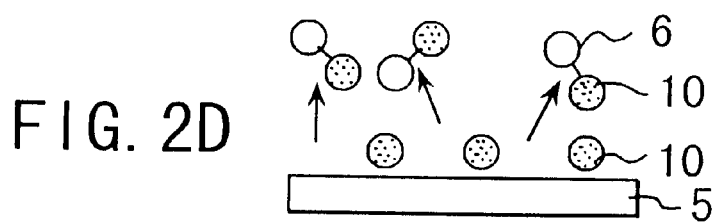

Then, as illustrated in FIG. 2A, aluminum atoms 10 are evaporated onto a surface of the silicon substrate 5 on which the adatoms 6 form the pattern 8. Since the aluminum atoms 10 have high reactivity with the chlorine atoms 6 and have a characteristic of readily depositing on the silicon substrate 5, the aluminum atoms 10 are adsorbed onto the silicon substrate 5 in an area where the adatoms or chlorine atoms 6 are not adsorbed, as illustrated in FIG. 2C. In addition, as illustrated in FIG. 2D, the chlorine atoms 6 adsorbed on the silicon substrate 5 react with the aluminum atoms 10 to thereby desorb from the silicon substrate 5.

As a result, the aluminum atoms 10 adsorbed onto the silicon substrate 5 form a pattern 11. That is, the chlorine atoms 6 adsorbed on the silicon substrate 5 act as if they are a photoresist in photolithography for aluminum evaporation. In the instant embodiment, the deposition of the aluminum atoms 10 and the desorption of the chlorine atoms 6 simultaneously take place.

The used atomic mask 4 which adsorbs the chlorine atoms 6 thereto as illustrated in FIG. 1D can be recovered for reuse by heating the used atomic mask 4 to thereby desorb the chlorine atoms 6 from the tungsten atoms 2.

As the mask atoms 2 of which the mask pattern 3 is composed, there may be used metal atoms having a relatively large mass, such as noble metal atoms. Specifically, platinum (Pt), gold (Au) and palladium (Pd) atoms as well as tungsten atoms may be used as the mask atoms 2. It is preferable to employ halogen atoms as the adatoms 6, such as chlorine (Cl), fluorine (F) and bromine (Br), because halogen atoms have high reactivity with other atoms, and hence the desorption of the adatoms 6 can be facilitated when the atomic mask 4 is placed close to the adatoms 6 adsorbed on the silicon substrate 5.

Figure 7A:
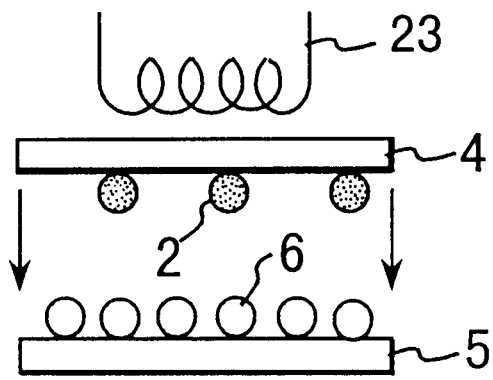
FIGS. 7A to 7C are side views illustrating variations of the first to fourth embodiments of the present invention.
Figure 7B:
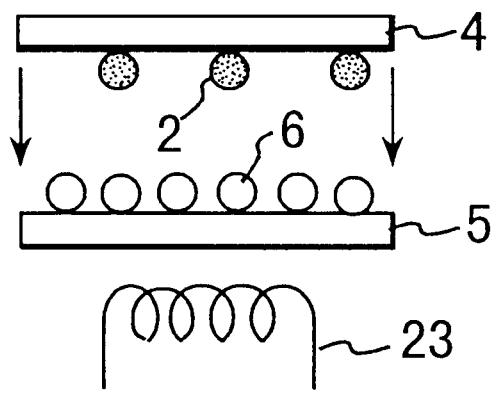
Figure 7C:
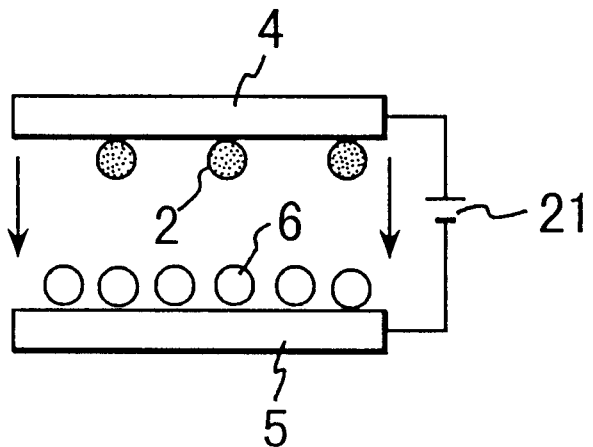

As illustrated in FIGS. 7A and 7B, the atomic mask 4 and/or the silicon substrate 5 may be heated with a heater 23 when the atomic mask 4 is placed close to the silicon substrate 5. As an alternative, an electric power source 21 may be employed to apply a voltage across the atomic mask 4 and the silicon substrate 5 to thereby generate an electric field while the atomic mask 4 is being put close to the silicon substrate 5. The field effect brought by the electric field would facilitate the desorption of the adatoms 6 from the silicon substrate 5. When the atomic mask and/or the silicon substrate 5 is heated as illustrated in FIG. 7A or when a voltage is applied across the atomic mask 4 and the silicon substrate 5 as illustrated in FIG. 7B, as well as when the current 7 is applied to the atomic mask 4 as illustrated in FIG. 1E, there may be used gas atoms as the adatoms 6, which have a relatively small mass. For instance, hydrogen, oxygen, helium and argon gases may be used to provide the adatoms 6.

In accordance with the instant embodiment, if the atomic mask 4 is once formed, it is possible to repeatedly form the same patterns by employing the atomic mask 4. Accordingly, the instant embodiment significantly shortens a period of time for forming a pattern on a substrate and forms a pattern more readily in contrast to conventional methods where a STM probe has to be moved atom by atom and a voltage has to be repeatedly applied across the STM probe and a substrate.

The second embodiment in accordance with the present invention is explained hereinbelow with reference to FIGS. 3A to 3F. The second embodiment has the same steps until the chlorine atoms 6 make the pattern 8 on the silicon substrate 5. Only subsequent steps are different between the first and second embodiments. Hence, there are explained hereinbelow only steps different from the first embodiment.

Figure 3A:
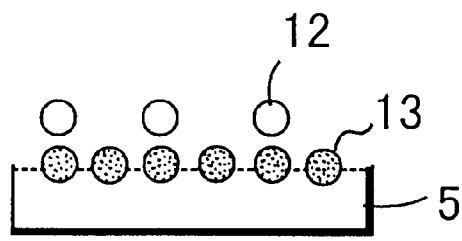
FIGS. 3A to 3F are perspective or side views of a substrate, showing respective steps of a method of patterning a substrate by employing an atomic mask, in accordance with the second embodiment of the present invention.
Figure 3B:
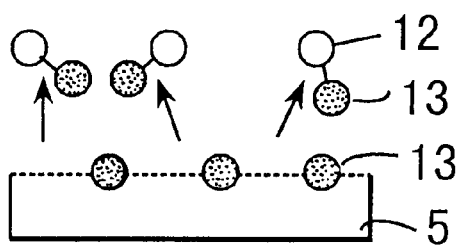

After the chlorine atoms 12 have formed the pattern 8 on the silicon substrate 5 as illustrated in FIG. 3A, the silicon substrate 5 is heated up to about 650 degrees centigrade. Herein, the chlorine atoms 12 have a characteristic of etching silicon. Hence, an etching reaction takes place by heating the silicon substrate 5 between the chlorine atoms 12 and silicon atoms 13 at a surface of the silicon substrate 5. As a result, as illustrated in FIG. 3B, the silicon atoms 13 located just beneath the chlorine atoms 12 are etched out, thereby there is formed a pattern on a surface of the silicon substrate 5. The pattern is defined with a recessed or etched portion at which the adatoms 12 used to exist, and a raised or non-etched portion at which the adatoms 12 does not exist.

Figure 3C:
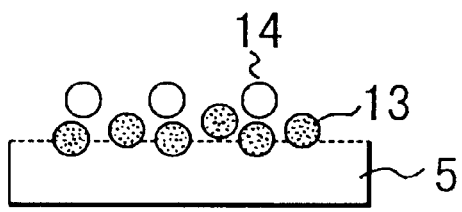
Figure 3D:
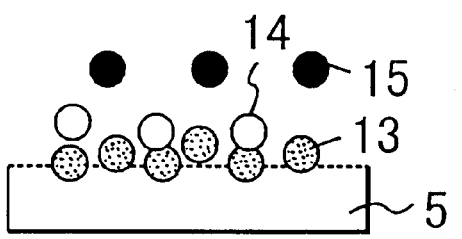
Figure 3E:
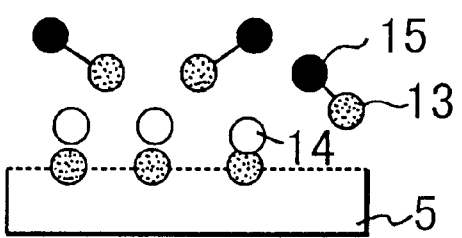
Figure 3F:
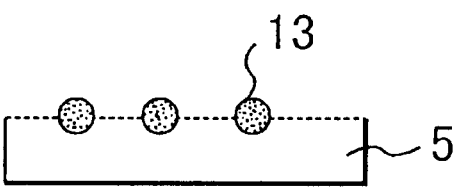

As illustrated in FIGS. 3C and 3D, non-reactive gas atoms 14 such as nitrogen atoms may be adsorbed as the adatoms on a surface of the silicon substrate 5. Then, fluorine gas is applied to a surface of the silicon substrate 5. The fluorine gas atoms 15 are adsorbed on the silicon substrate 5 in an area where the adatoms 14 are not adsorbed, because the adatoms 14 act as a mask. Since fluorine has a characteristic of etching silicon, the area of the substrate 5 where the adatoms 14 are not adsorbed is etched, as illustrated in FIG. 3E. Thus, there is formed a pattern on the silicon substrate. The pattern is defined with a recessed or etched portion at which the adatoms 14 used not to exist, and a raised or non-etched portion at which the adatoms 14 exist. The adatoms 14 having acted as an etching mask may be removed by heating treatment, as illustrated in FIG. 3F.

It should be noted that the pattern as explained with reference to FIG. 3B is opposite to the pattern as explained with reference to FIG. 3F with respect to the raised and recessed portions both of which the patterns are formed.

The third embodiment in accordance with the present invention is explained hereinbelow with reference to FIGS. 4A to 4D. The third embodiment has the same steps until the adatoms form the pattern 8 on the silicon substrate 5. Only subsequent steps are different between the first and third embodiments. Hence, there are explained hereinbelow only steps different from the first embodiment.

Figure 4A:
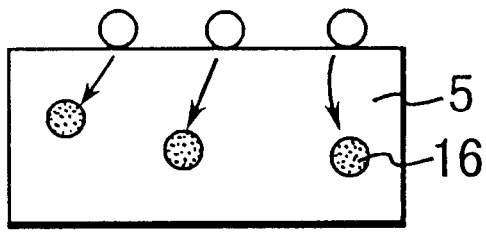
FIGS. 4A to 4D are perspective or side views of a substrate, showing respective steps of a method of patterning a substrate by employing an atomic mask, in accordance with the third embodiment of the present invention.

In the third embodiment, the adatom is selected from atoms which are readily doped into the silicon substrate 5, such as boron and nitrogen. Hence, the pattern 8 formed on the silicon substrate is composed of boron atoms 16 as the adatoms in the instant embodiment. After the pattern 8 has been formed on the silicon substrate 5, the substrate 5 is heated for about 2 hours at 250 degrees centigrade. As a result, as illustrated in FIG. 4A, the boron atoms 16 are diffused into the silicon substrate 5, thereby the doping atoms 16 forming a pattern in the silicon substrate 5. Since the instant embodiment makes it possible to dope at atomic level, a steep profile may be accomplished in doping.

Figure 4B:
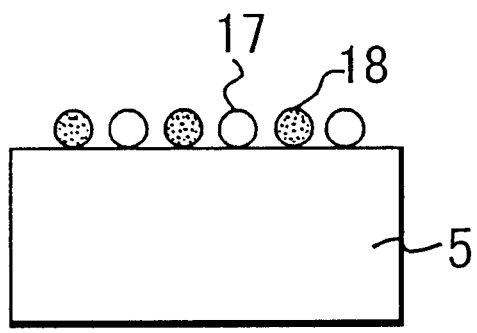
Figure 4C:
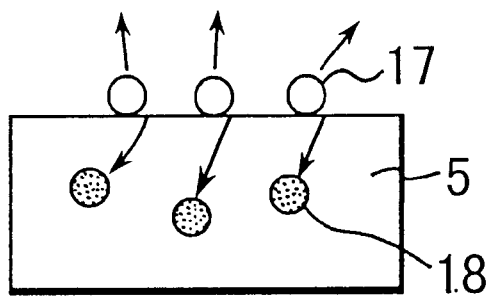
Figure 4D:
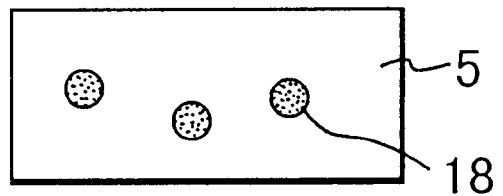

As an alternative, as illustrated in FIG. 4B, non-reactive gas atoms 17 may be adsorbed on the silicon substrate 5 as the adatoms. Nitrogen atoms 18 as the doping atoms are applied to the silicon substrate 5, so that the nitrogen atoms 18 are adsorbed on the silicon substrate 5 in an area where the non-reactive gas atoms 17 are not adsorbed. Then, the silicon substrate 5 is heated to thereby diffuse the nitrogen atoms 18 into the silicon substrate 5 with the non-reactive gas atoms 17 being used as a mask, as illustrated in FIG. 4C. Thus, there is formed a pattern as illustrated in FIG. 4D. The thus formed pattern is opposite to the previously mentioned pattern in terms of a diffusion region. That is, an area where the adatoms 16 exist is doped in FIG. 4A, whereas an area where the adatoms 17 do not exist is doped in FIG. 4B. The non-reactive gas atoms or adatoms 17 having acted as a mask in doping are desorbed while the silicon substrate 5 is heated for doping, as illustrated in FIG. 4D.

In accordance with the above mentioned second and third embodiments, it is possible to shorten a period of time for forming a pattern on a substrate and form a pattern more readily in contrast to conventional methods, similarly to the first embodiment.

Figure 5A:
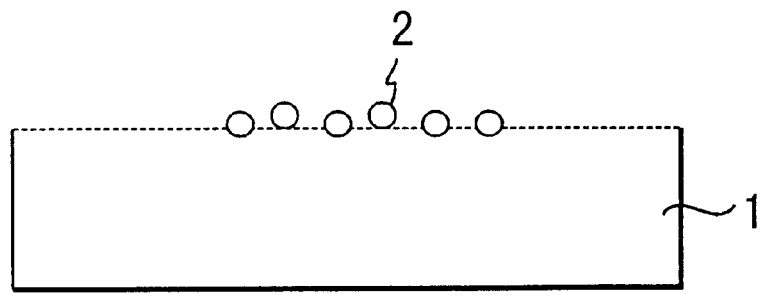
FIGS. 5A and 5B are side views of an atomic mask, showing respective steps of a method of patterning a substrate by employing an atomic mask, in accordance with the fourth embodiment of the present invention.

Hereinbelow is explained the fourth embodiment with reference to FIGS. 5A, 5B and 8. In the instant embodiment, an atomic mask is improved in configuration. When the atomic mask 4 is placed close to the adatoms 6 adsorbed on the silicon substrate 5, a chemical bonding force to be generated between the mask atoms and the adatoms 6 is deteriorated by other atoms. Thus, in order to reduce the deterioration of the chemical bonding force, an area of the mask substrate 1 other than an area where the mask pattern 3 is to be formed is etched by means of a STM prior to the formation of the mask pattern 3.

Figure 8:
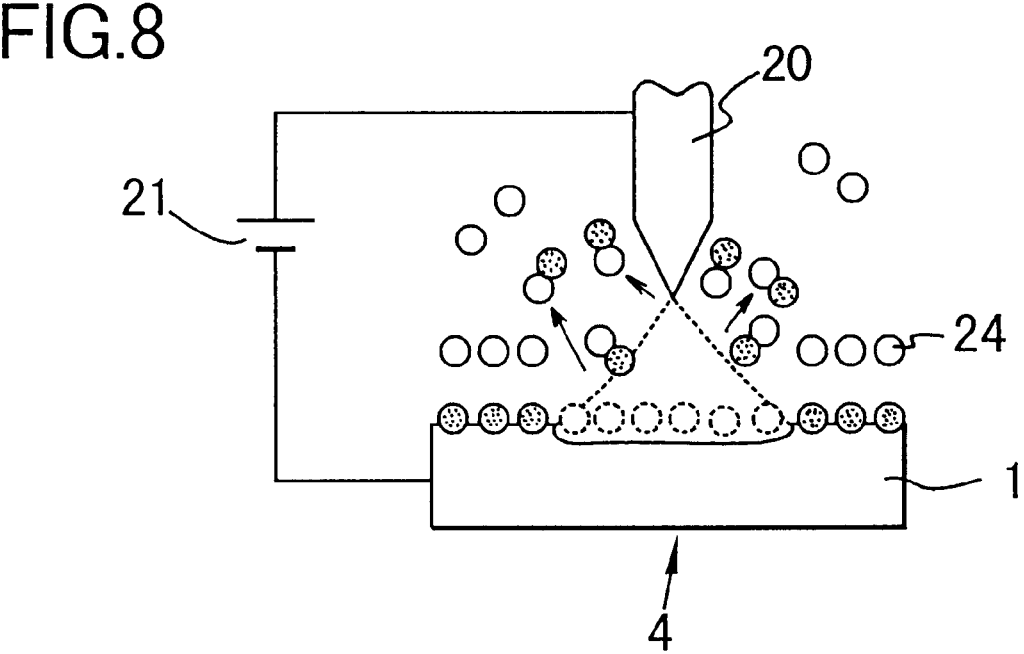
FIG. 8 is a side view of an atomic mask, illustrating another method of fabricating an atomic mask.

Specifically, as illustrated in FIG. 8, fluorine atoms 24 are adsorbed onto a surface of the silicon substrate 1. Then, a probe 20 of a STM is placed close to an area of the silicon substrate 1 which is intended to be etched, and thereafter a voltage of about 3 V is applied across the probe 20 and the silicon substrate 1 through an electric power source 21. As a result, an area where the probe 20 scans is etched out. Subsequently, for instance, the first embodiment is carried out to thereby form the mask pattern 3 of the tungsten atoms 2.

Figure 5B:
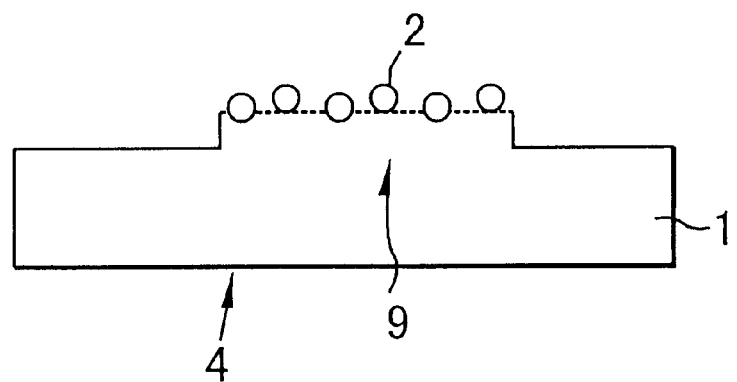

In accordance with the fourth embodiment, an area 9 where the mask pattern 3 is to be formed is raised relative to other areas of the mask substrate 1, as illustrated in FIG. 5B. Hence, when the atomic mask 4 is placed close to the silicon substrate 5, silicon atoms located in an area other than the area 9 exert less influence on the adatoms 6 adsorbed on the silicon substrate 5, resulting in significant enhancement in reactivity between the adatoms 6 and the tungsten atoms 2.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 8-89738 filed on Apr. 11, 1996 including specification, claims, drawings and summary is incorporated herein by reference in its entirety.

What is claimed is:

1. A method of recovering an atomic mask comprising a mask substrate and atoms adsorbed on said mask substrate, said atoms forming a mask pattern having a one-atomic thickness and adsorbing adatoms used to be deposited on a substrate to be patterned, comprising the step of heating said atomic mask in ultra-high vacuum.

2. A method of patterning a substrate with an atomic mask comprising a mask substrate and first atoms adsorbed on said mask substrate, said first atoms forming a mask pattern having a one-atomic thickness, comprising the steps, in sequence, of:

(a) depositing adatoms over a surface of a substrate to be patterned, said adatonms having low reactivity with second atoms of which said substrate is composed; and (b) placing said atomic mask close to said substrate in such a distance that said first atoms form a chemical bond with said adatoms, so that adatoms located nearest to said first atoms are desorbed out of said substrate to form a pattern on said substrate, said pattern being defined as an area where none of said adatoms exists.

3. The method as set forth in claim 2, wherein a current is applied to said mask pattern during said step (b).

4. The method as set forth in claim 3, wherein said adatoms are halogen atoms.

5. The method as set forth in claim 2, wherein at least one of said atomic mask and said substrate is heated during said step (b).

6. The method as set forth in claim 2, wherein a voltage is applied across said atomic mask and said substrate.

7. A method of patterning a substrate with an atomic mask comprising a mask substrate and first atoms adsorbed on said mask substrate, said first atoms forming a mask pattern having a one-atomic thickness, comprising the steps of:

(a) forming a raised area on said mask substrate, said mask pattern being to be formed within said raised area;

(b) depositing adatoms over a surface of a substrate to be patterned, said adatoms having low reactivity with second atoms of which said mask substrate is composed; and (c) placing said atomic mask close to said substrate in such a distance that said first atoms form a chemical bond with said adatoms, so that adatoms located nearest to said first atoms are desorbed out of said substrate to form a pattern on said substrate, said pattern being defined as an area where none of said adatoms exists, one of said steps (a) and (b) being first carried out and said step (c) being finally carried out.

8. The method as set forth in claim 7, wherein said raised area is formed in said step (a) by etching an area other than said raised area.

9. The method as set forth in claim 8, wherein said raised area is formed by the steps of depositing adatoms over a surface of said mask substrate, placing a probe of a scanning tunneling microscope close to said mask substrate, and scanning said mask substrate with said probe with a voltage being applied across said mask substrate and said probe.

10. The method as set forth in claim 7, wherein a current is applied to said mask pattern during said step (c).

11. The method as set forth in claim 7, wherein at least one of said atomic mask and said substrate is heated during said step (b).

12. The method as set forth in claim 7, wherein a voltage is applied across said atomic mask and said substrate.

13. The method as set forth in claim 7, wherein said adatoms are halogen atoms.

14. A method of patterning a substrate with an atomic mask comprising a mask substrate and first atoms adsorbed on said mask substrate, said first atoms forming a mask pattern having a one-atomic thickness, comprising the steps, in sequence, of:

(a) depositing adatoms over a surface of a substrate to be patterned, said adatoms having low reactivity with second atoms of which said substrate is composed;

(b) placing said atomic mask close to said substrate in such a distance that said first atoms form a chemical bond with said adatoms, so that adatoms located nearest to said first atoms are desorbed out of said substrate to form a pattern on said substrate, said pattern being defined as a first area where none of said adatoms exists; and (c) depositing third atoms having high reactivity with said adatoms and making a bond with said second atoms, over a surface of said substrate to form a pattern in said first area and making adatoms to be desorbed out of said substrate due to reaction with said third atoms, said pattern being defined as a second area where only said third atoms exist.

15. The method as set forth in claim 14, wherein a current is applied to said mask pattern during said step (b).

16. The method as set forth in claim 14, wherein at least one of said atomic mask and said substrate is heated during said step (b).

17. The method as set forth in claim 14, wherein a voltage is applied across said atomic mask and said substrate.

18. The method as set forth in claim 14 further comprising the step of (d) forming a raised area on said mask substrate, said mask pattern being to be formed within said raised area, said step (d) being carried out prior to said step (b).

19. The method as set forth in claim 14, wherein said adatoms are halogen atoms.

20. A method of patterning a substrate with an atomic mask comprising a mask substrate and first atoms adsorbed on said mask substrate, said first atoms forming a mask pattern having a one-atomic thickness, comprising the steps, in sequence, of:

(a) depositing adatoms over a surface of a substrate to be patterned, said adatoms being composed of etching gas atoms, said substrate being composed of second atoms;

(b) placing said atomic mask close to said substrate in such a distance that said first atoms form a chemical bond with said adatoms, so that adatoms located nearest to said first atoms are desorbed out of said substrate to form a pattern on said substrate, said pattern being defined as an area where none of said adatoms exists; and (c) causing said adatoms and said second atoms to react with each other for making both said adatoms and said second atoms to be desorbed out of said substrate to etch a portion of said substrate where said adatoms used to be adsorbed.

21. The method as set forth in claim 20, wherein a current is applied to said mask pattern during said step (b).

22. The method as set forth in claim 20, wherein at least one of said atomic mask and said substrate is heated during said step (b).

23. The method as set forth in claim 20, wherein a voltage is applied across said atomic mask and said substrate.

24. The method as set forth in claim 20 further comprising the step of (d) forming a raised area on said mask substrate, said mask pattern being to be formed within said raised area, said step (d) being carried out prior to said step (b).

25. The method as set forth in claim 20, wherein said adatoms are halogen atoms.

26. A method of patterning a substrate with an atomic mask comprising a mask substrate and first atoms adsorbed on said mask substrate, said first atoms forming a mask pattern having a one-atomic thickness, comprising the steps, in sequence, of:

(a) depositing adatoms over a surface of a substrate to be patterned, said adatoms having low reactivity with second atoms of which said substrate is composed;

(b) placing said atomic mask close to said substrate in such a distance that said first atoms form a chemical bond with said adatoms, so that adatoms located nearest to said first atoms are desorbed out of said substrate to form a pattern on said substrate, said pattern being defined as an area where none of said adatoms exist; and (c) depositing etching gas atoms onto said substrate with said adatoms being used as a mask for causing said second atoms and said etching gas atoms to react with each other to make both said second atoms and said etching gas atoms desorb from said substrate, thereby a portion of said substrate where none of said adatoms exists being etched.

27. The method as set forth in claim 26, wherein a current is applied to said mask pattern during said step (b).

28. The method as set forth in claim 26, wherein at least one of said atomic mask and said substrate is heated during said step (b).

29. The method as set forth in claim 26, wherein a voltage is applied across said atomic mask and said substrate.

30. The method as set forth in claim 26 further comprising the step of (d) forming a raised area on said mask substrate, said mask pattern being to be formed within said raised area, said step (d) being carried out prior to said step (b).

31. The method as set forth in claim 26, wherein said adatoms are halogen atoms.

32. The method as set forth in claim 26 further comprising the step (e) of removing said adatoms out of said substrate, said step (e) being carried out subsequently to said step (c).

33. A method of patterning a substrate with an atomic mask comprising a mask substrate and first atoms adsorbed on said mask substrate, said first atoms forming a mask pattern having a one-atomic thickness, comprising the steps, in sequence, of:

(a) depositing adatoms over a surface of a substrate to be patterned, said adatoms being composed of atoms which are readily doped into said substrate, said substrate being composed of second atoms;

(b) placing said atomic mask close to said substrate in such a distance that said first atoms form a chemical bond with said adatoms, so that adatoms located nearest to said first atoms are desorbed out of said substrate to form a pattern on said substrate, said pattern being defined as an area where none of said adatoms exists; and (c) causing said adatoms to diffuse into said substrate.

34. The method as set forth in claim 33, wherein a current is applied to said mask pattern during said step (b).

35. The method as set forth in claim 33, wherein at least one of said atomic mask and said substrate is heated during said step (b).

36. The method as set forth in claim 33, wherein a voltage is applied across said atomic mask and said substrate.

37. The method as set forth in claim 33 further comprising the step of (d) forming a raised area on said mask substrate, said mask pattern being to be formed within said raised area, said step (d) being carried out prior to said step (b).

38. The method as set forth in claim 33, wherein said adatoms are halogen atoms.

39. A method of patterning a substrate with an atomic mask comprising a mask substrate and first atoms adsorbed on said mask substrate, said first atoms forming a mask pattern having a one-atomic thickness, comprising the steps, in sequence, of:

(a) depositing adatoms over a surface of a substrate to be patterned, said adatoms having low reactivity with second atoms of which said substrate is composed;

(b) placing said atomic mask close to said substrate in such a distance that said first atoms form a chemical bond with said adatoms, so that adatoms located nearest to said first atoms are desorbed out of said substrate to form a pattern on said substrate, said pattern being defined as an area where none of said adatoms exists; and (c) depositing doping atoms over said substrate with said adatoms being used as a mask for causing said doping atoms to diffuse into said substrate.

40. The method as set forth in claim 39, wherein a current is applied to said mask pattern during said step (b).

41. The method as set forth in claim 39, wherein at least one of said atomic mask and said substrate is heated during said step (b).

42. The method as set forth in claim 39, wherein a voltage is applied across said atomic mask and said substrate.

43. The method as set forth in claim 39 further comprising the step of (d) forming a raised area on said mask substrate, said mask pattern being to be formed within said raised area, said step (d) being carried out prior to said step (b).

44. The method as set forth in claim 39, wherein said adatoms are halogen atoms.

\* \* \* \* \*

UNITED STATES PATENT AND TRADEMARK OFFICE
CERTIFICATE OF CORRECTION

PATENT NO.    : 6,331,238 B1
DATED         : December 18, 2001
INVENTOR(S)   : Yokoyama et al.

It is certified that error appears in the above-identified patent and that said Letters Patent is hereby corrected as shown below:

Title page,
Item [54], change title to read -- ATOMIC MASK AND METHOD OF PATTERNING A SUBSTRATE WITH AN ATOMIC MASK --.

Column 10,
Line 59, change "adatonms" to -- adatoms --.

Signed and Sealed this

Seventeenth Day of June, 2003

JAMES E. ROGAN
*Director of the United States Patent and Trademark Office*